(12) United States Patent
Sato

(10) Patent No.: US 8,379,936 B2
(45) Date of Patent: Feb. 19, 2013

(54) AUTHENTICATION APPARATUS AND AUTHENTICATION SYSTEM

(75) Inventor: Jun Sato, Saitama (JP)

(73) Assignee: Fuji Xerox Co., Ltd., Tokyo (JP)

(*) Notice: Subject to any disclaimer, the term of this patent is extended or adjusted under 35 U.S.C. 154(b) by 704 days.

(21) Appl. No.: 12/406,600

(22) Filed: Mar. 18, 2009

(65) Prior Publication Data

US 2009/0238418 A1    Sep. 24, 2009

(30) Foreign Application Priority Data

Mar. 24, 2008    (JP) .................................. 2008-074997

(51) Int. Cl.
*G06K 9/00* (2006.01)

(52) U.S. Cl. ........ 382/115; 382/117; 382/118; 382/119; 382/124

(58) Field of Classification Search .......... 382/115–119, 382/123–127
See application file for complete search history.

(56) References Cited

U.S. PATENT DOCUMENTS

| | | | | |
|---|---|---|---|---|
| 6,084,977 A * | 7/2000 | Borza | ............................ | 382/124 |
| 6,911,907 B2 * | 6/2005 | Kelliher et al. | ................ | 340/522 |
| 6,980,669 B1 * | 12/2005 | Uchida | ......................... | 382/115 |
| 7,035,441 B2 * | 4/2006 | Bergenek et al. | ............. | 382/124 |
| 7,366,328 B2 * | 4/2008 | Hamid et al. | ................... | 382/115 |
| 7,436,989 B2 * | 10/2008 | Chung et al. | ................... | 382/119 |
| 7,505,613 B2 * | 3/2009 | Russo | ........................... | 382/124 |
| 8,014,570 B2 * | 9/2011 | Le Saint et al. | ............... | 382/115 |
| 2006/0115129 A1 * | 6/2006 | Abe | ............................. | 382/115 |

FOREIGN PATENT DOCUMENTS

| | | |
|---|---|---|
| JP | 06-208611 A | 7/1994 |
| JP | 2000-163578 A | 6/2000 |
| JP | 2001-167053 A | 6/2001 |
| JP | 2001-283223 A | 10/2001 |
| JP | 2004-272508 A | 9/2004 |
| JP | 2004272508 A * | 9/2004 |

OTHER PUBLICATIONS

Gian Luca Marcialis and Fabio Roli, "Fingerprint Verification by Fusion of Optical and Capacitive Sensors" Elsevier, Pattern Recognition Letters, vol. 25, Issue 11, Aug. 2004, pp. 1315-1322.*
Notification of Reasons for Refusal issued in a counterpart application No. 2008-074997, dated Feb. 16, 2010.

* cited by examiner

*Primary Examiner* — Eric Rush
(74) *Attorney, Agent, or Firm* — Sughrue Mion, PLLC

(57) ABSTRACT

An authentication apparatus includes: an acquiring section that acquires a piece of biometric authentication information; a controlling section that causes the acquiring section to acquire plural pieces of biometric authentication information and causes to execute a biometric authentication based on the plural pieces of biometric authentication information; a storing section that stores, as reference information, a first one of the plural pieces of biometric authentication information, which is acquired and authenticated precedently among the plural pieces of biometric authentication information; and a discriminating section that determines, based on a degree of similarity between the reference information stored in the storing section and a second one of the plural pieces of biometric authentication information, that authentication is rejected when the degree of similarity exceeds a prescribed degree of similarity. The second one of the plural pieces of biometric authentication information is acquired subsequently among the plural pieces of biometric authentication information.

6 Claims, 3 Drawing Sheets

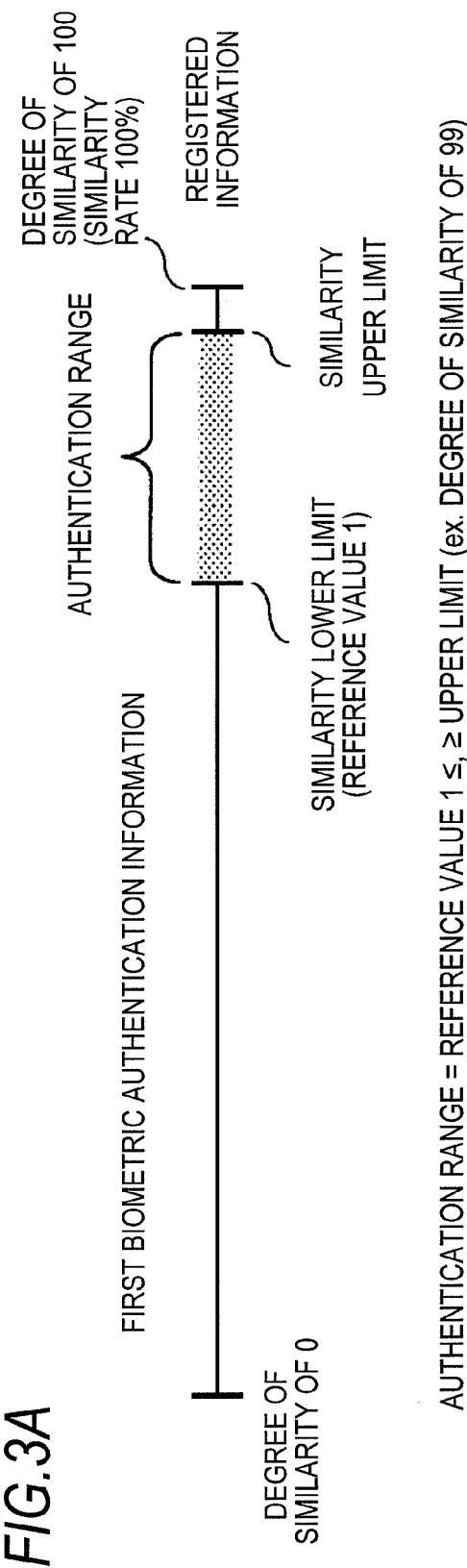
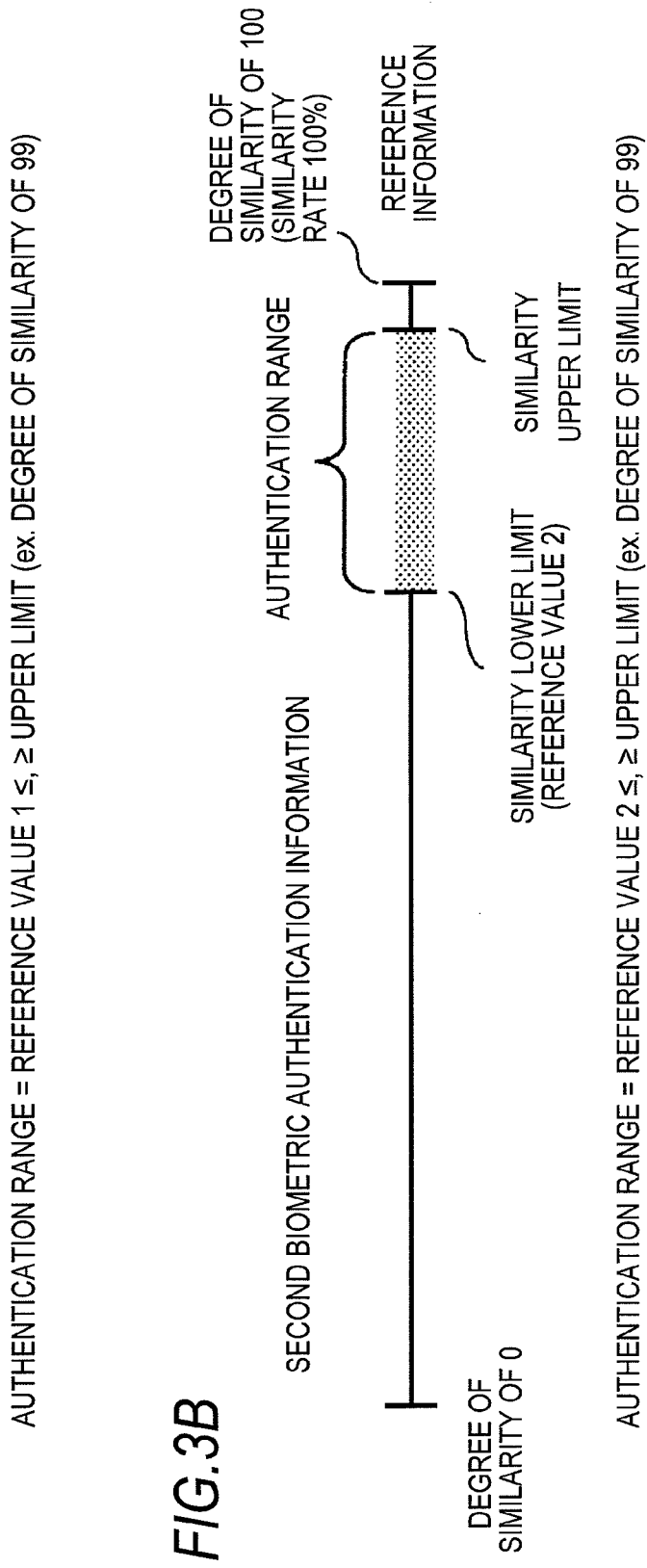
FIG.3A
FIG.3B

AUTHENTICATION APPARATUS AND AUTHENTICATION SYSTEM

CROSS-REFERENCE TO RELATED APPLICATIONS

This application is based on and claims priority under 35 USC 119 from Japanese Patent Application No. 2008-074997 filed Mar. 24, 2008.

BACKGROUND

1. Technical Field

The present invention relates to an authentication apparatus and an authentication system.

2. Related Art

Recently, a variety of equipment have adopted personal authentication for a user of the equipment, and attempts have been made to utilize, for the user authentication, various information of a password, an IC card, a fingerprint, a vein and the like. In using a password for the authentication, however, when the password is known by a third party, the third party can be an impostor. In using what is called a physical key such as an IC card for the authentication, when the IC card is stolen, a third party can be an impostor by using information stored in the IC card. On the other hand, biometric authentication information of a fingerprint or a vein is peculiar to each person, and therefore, the authentication using such information can be improved in the safety and the reliability as compared with those of the other authentication methods using a password or the like. Accordingly, personal authentication using biometric authentication information (biometric data) such as fingerprint information, signature information or finger or palm vein information has been recently widely employed and earnestly studied.

SUMMARY

According to an aspect of the invention, an authentication apparatus includes: an acquiring section that acquires a piece of biometric authentication information; a controlling section that causes the acquiring section to acquire plural pieces of biometric authentication information and causes to execute a biometric authentication based on the plural pieces of biometric authentication information; a storing section that stores, as reference information, a first one of the plural pieces of biometric authentication information, which is acquired and authenticated precedently among the plural pieces of biometric authentication information; and a discriminating section that determines, based on a degree of similarity between the reference information stored in the storing section and a second one of the plural pieces of biometric authentication information, that authentication is rejected when the degree of similarity exceeds a prescribed degree of similarity. The second one of the plural pieces of biometric authentication information is acquired subsequently among the plural pieces of biometric authentication information.

BRIEF DESCRIPTION OF THE DRAWINGS

Exemplary embodiment(s) of the present invention will be described in detail based on the following figures, wherein:

FIGS. 3A and 3B are diagrams for illustrating references for authentication ranges adopted in authentication according to the exemplary embodiment of the invention.

DETAILED DESCRIPTION

Figure 1:
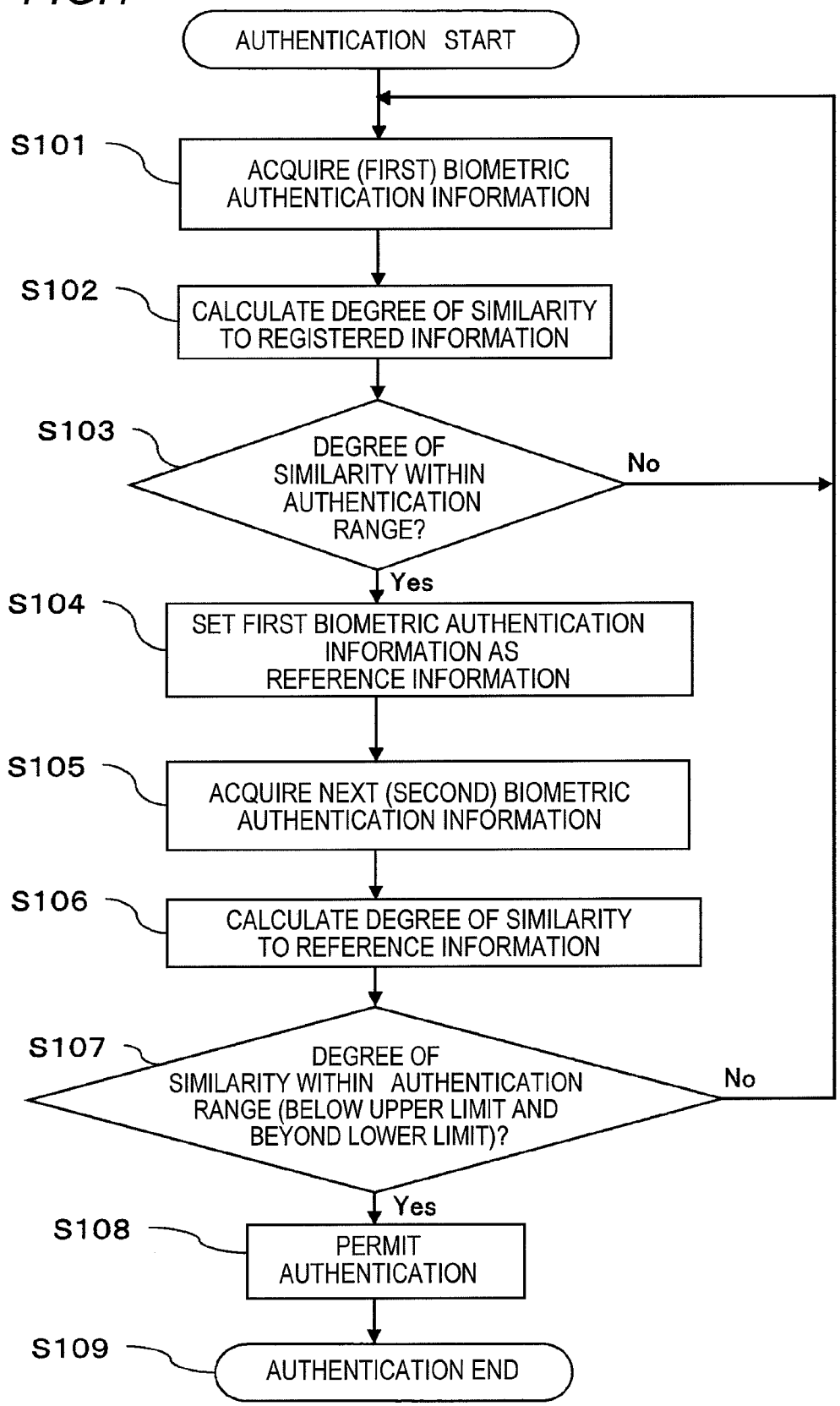
FIG. 1 is a flowchart illustrating an exemplary authentication method according to an exemplary embodiment of the invention.
Figure 2:
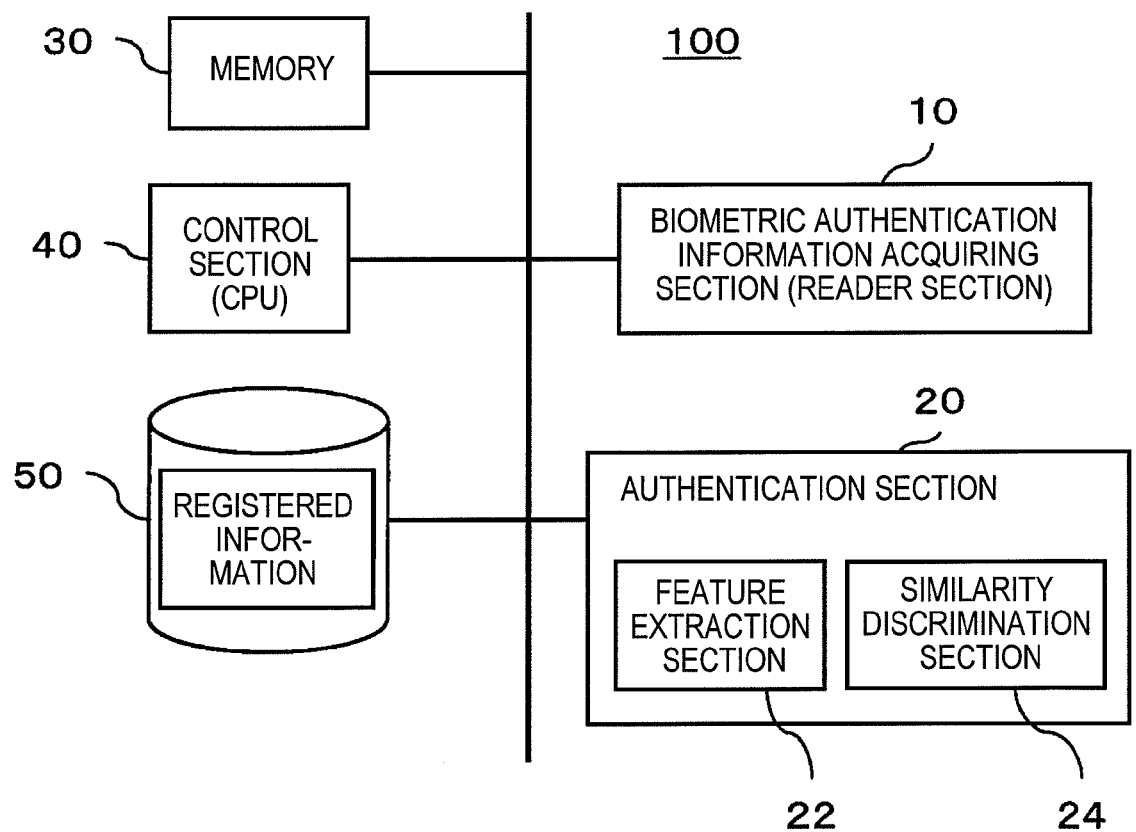
FIG. 2 is a diagram schematically illustrating an exemplary structure of an authentication system according to the exemplary embodiment of the invention.

An exemplary embodiment of the invention will now be described with reference to the accompanying drawings. FIG. 1 illustrates a biometric authentication method of this exemplary embodiment and FIG. 2 illustrates an exemplary system capable of executing biometric authentication of this exemplary embodiment.

The present authentication system 100 includes a reader section (an example of biometric authentication information acquiring section) 10 for acquiring biometric authentication information; and an authentication section 20 for performing authentication on the basis of a degree of similarity between the biometric authentication information obtained from the reader section 10 and prescribed information described later. An apparatus to which the present authentication system 100 is applied is not particularly specified as far as a system including apparatus requires authentication. and the present authentication system 100 is applicable to, for example, an authentication system for a copying machine, a facsimile machine, a complex information machine having a copying function, a communication function and a printing function, information equipment such as a computer, an automatic teller machine (ATM), or an entry/exit management apparatus for a facility.

When the biometric authentication information is, for example, fingerprint information, the reader section 10 reads irregularities on a finger surface, that is, a fingerprint, of a person. For reading a fingerprint, any of various devices can be used in accordance with specifications such as the structure of the reader section, the place for installing it and its reading accuracy. For example, an optical sensor device utilizing a photoelectric conversion element such as a CCD may be used, and in using such a device, the intensity of light reflected on the irregularities on a finger surface is used for imaging.

An example of the optical sensor device is an area sensor that two-dimensionally reads irregularities information on the whole finger surface through one scanning. Alternatively, a space-saving line sensor in a linear shape may be used. In using a line sensor, fingerprint information of the whole finger is obtained by reconstructing fingerprint data in a strip shape obtained on respective prescribed lines at every prescribed scanning timing.

Apart from the optical sensor, the reader section 10 may be a pressure sensitive film sensor that detects a pressure difference derived from the surface irregularities obtained in pressing a finger onto the film, or an electrostatic sensor that detects contact/noncontact of a finger surface derived from the irregularities, so that the detected data can be used for imaging.

In the case where not a fingerprint but a vein, an iris of a pupil, a facial image or handwriting is used as the biometric authentication information, the information can be read by using an optical sensor or the like in the same manner as described above, and in the case where a voice print is used as the biometric authentication information, voice print information can be acquired by using a microphone as another example of the biometric authentication information acquiring section.

The authentication section 20 authenticates the biometric authentication information acquired by the reader section 10 as described above. The authentication section 20 includes, for example, a feature extraction section 22 for extracting a given feature from the biometric authentication information acquired by the reader section 10 and a discrimination section 24 for discriminating whether or not authentication is permitted by deciding whether or not the degree of similarity between the prescribed information described later and the biometric authentication information meets a prescribed reference. In the case where the feature extraction section 22 is included as shown in FIG. 2, the discrimination section 24 discriminates a degree of similarity between a feature portion extracted from the biometric authentication information and a feature portion of the prescribed information used as the reference.

The authentication section 20 may be constructed from an integrated circuit including respective functional portions as circuit elements, or a part or all of its functions may be realized by a program. Such a program can be stored in a certain recording medium to be installed in a computer for the operation. In order to prevent the feature extraction or the authentication discrimination from being harmfully affected by noise superimposed in the acquired biometric authentication information, an information compensation section such as a noise filter may be provided so as to remove noise from the biometric authentication information before extracting a feature portion from the biometric authentication information or before the discrimination.

Furthermore, the authentication system 100 may further include a memory 30 as an example of a storing section of the system, a control section (CPU) 40 as an example of a control section of the system and an information storage section 50 that can be constructed from any of various storage media such as a hard disk. The memory 30 can store reference information (that is, prescribed biometric authentication information having been acquired) or process instructions used in the system. The control section 40 has a function to control the biometric authentication process. And the information storage section 50 previously stores registered biometric authentication information used as the reference for the authentication. It is noted that the information storage section 50 may be used as an example of storing section for the reference information, and in this case, the information storage section 50 stores not only the registered biometric authentication information but also the prescribed reference information.

The whole authentication system 100 of this exemplary embodiment shown in FIG. 2 may be included in, externally provided on or provided in the vicinity of equipment requiring the personal authentication as an authentication apparatus. In other words, the authentication system 100 can employ a structure in which the authentication section 20 and the like are provided in the vicinity of the reader section 10.

Alternatively, it may employ a structure in which the reader section 10 is provided on equipment requiring the personal authentication with the remaining components including the authentication section 20, the memory 30, the control section 40 and the information storage section 50 installed in a separate place.

In either of the aforementioned structures, information transmission from the reader section 10 to the authentication section 20 may be executed through communication using a direct wiring or by using a communication device through a wired or radio communication line or the like. In such communication, information to be transmitted may be encrypted.

The structure of the system may be variously modified in accordance with the use form of the authentication system, and for example, the reader section 10, the authentication section 20, the memory 30 and the control section 40 may be disposed together with equipment having an authentication function with the information storage section 50 provided as a server at a distance.

In the authentication of this exemplary embodiment, biometric authentication information is acquired a plurality of times (that is, at least twice) for the authentication by using the aforementioned system or apparatus, so as to execute biometric authentication on the basis of the plural pieces of biometric authentication information. In the authentication of this exemplary embodiment, with respect to biometric authentication information acquired subsequently, a degree of similarity not to registered information but to biometric authentication information having been acquired precedently as reference information and having been authenticated is determined, and when the degree of similarity exceeds a prescribed similarity upper limit, the authentication is rejected.

Specifically, the authentication is performed as follows: First, as shown in FIG. 1, when the authentication is started, the reader section 10 performs first read of biometric authentication information so as to acquire biometric authentication information (S101).

The first biometric authentication information (i.e., biometric authentication information having been acquired precedently) acquired by the reader section 10 is transmitted to the authentication section 20 through, for example, the aforementioned communication device. The authentication section 20 extracts a feature portion from the biometric authentication information in accordance with the type of the information. Also, registered biometric authentication information, which has been previously stored in the information storage section 50 and should correspond to a person to be authenticated, is read from the information storage section 50, and the authentication section 20 obtains a degree of similarity between the first biometric authentication information and the registered biometric authentication information (S102).

The authentication section 20 determines whether or not the obtained degree of similarity meets a reference (i.e., is within a similarity range) set for identification, and when it is determined that the degree of similarity is outside the reference, namely, is beyond an upper limit value (similarity upper limit) or below a lower limit value (similarity lower limit), the authentication of the first biometric authentication information is rejected (NO in S103). When the authentication is rejected, the procedure returns to the step of reading first biometric authentication information (namely, S101), and the process for acquiring and authenticating first biometric authentication information is executed.

For the authentication of the first biometric authentication information, any of various known authentication methods may be employed, and for example, the authentication may be executed on the basis of a degree of similarity to registered biometric authentication information having been registered for the authentication as described above. Furthermore, when the acquired biometric authentication information completely accords with the registered biometric authentication information as a whole or in a part, the authentication may be rejected because there is a danger of an impostor.

When the degree of similarity between the first biometric authentication information and the registered information is within the prescribed similarity range (namely, YES in S103), the first biometric authentication information is set as reference information, which is stored in a storage device such as the memory 30 or the information storage section 50 (S104).

When the reference information is set, the control section 40 controls the reader section 10, so as to make the reader section 10 acquire new (that is, second in this case) biometric authentication information. In acquiring next biometric authentication information, the control section 40 may request the person to be authenticated to move for reading information again with screen display or speech by using a display device or a speaker not shown.

The authentication section 20 obtains a degree of similarity of the acquired second biometric authentication information to the reference information (S106). When the degree of similarity exceeds a prescribed similarity upper limit, the authentication section 20 rejects the authentication (NO in S107). Also, when the degree of similarity is below a prescribed similarity lower limit, it may reject the authentication (NO in S107). When the similarity lower limit is thus employed for the discrimination, false authentication can be avoided even when completely different information is used as the second biometric authentication information. When the authentication is rejected for any of the reasons, the procedure returns to the step of acquiring first biometric authentication information (namely, S101). On the other hand, when the degree of similarity is within a prescribed similarity range (namely, the degree of similarity is below the similarity upper limit and beyond the similarity lower limit in this case) (YES in S107), the authentication section 20 determines that the authentication is permitted (S108), and the authentication process is completed (S109).

When the degree of similarity between the second biometric authentication information and the reference information exceeds the similarity upper limit (namely, NO in S107), the procedure may return to the step of acquiring second biometric authentication information for discriminating the degree of similarity to the reference information (namely, S105) instead of returning to the step of acquiring first biometric authentication information for acquiring new reference information (namely, S101). In this case, when the authentication is rejected as a result of discrimination of the degree of similarity between newly acquired biometric authentication information and the reference information, for example, a prescribed number of times, the procedure returns to the first step (namely, S101) or the authentication process is completed (S109).

In the flowchart shown in FIG. 1, after the first biometric authentication information is set as the reference information (S104), the second biometric authentication information is acquired (S105). Instead, biometric authentication information may be read continuously plural times, and when biometric authentication information acquired first is set as the reference information (S104), the reference information may be used for discriminating a degree of similarity to second biometric authentication information already acquired. Alternatively, during the process for first biometric authentication information (namely, during calculation or discrimination of a degree of similarity), second biometric authentication information may be acquired.

The references of the authentication ranges employed in the authentication of this exemplary embodiment are schematically explained in FIGS. 3A and 3B. FIG. 3A illustrates an authentication range used as the standard condition for obtaining reference information and FIG. 3B illustrates an authentication range of a degree of similarity to reference information used as the standard condition for authenticating second biometric authentication information.

In FIG. 3A, when information having been registered beforehand as biometric authentication information of a person to be authenticated (namely, registered biometric authentication information) completely accords with biometric authentication information acquired first, the degree of similarity is 100 (i.e., a similarity rate is 100%). In this exemplary embodiment, when the degree of similarity of first biometric authentication information to registered biometric authentication information is within the prescribed authentication range, the authentication as the reference information is permitted, and hence, the acquired first biometric authentication information is adopted as the reference information.

Furthermore, although the upper limit of the authentication range (namely, the similarity upper limit) is set to a degree of similarity lower than 100 in the case exemplified in FIG. 3A, it may be set to a degree of similarity of 100 or less, namely, the upper limit may include a case where registered biometric authentication information accords with first biometric authentication information. As described above, biometric authentication information acquired plural times never completely accord with each other, and for example, even when fingerprint information of the same finger of the same person is acquired, the fingerprint pattern subtly differs every time it is acquired. Therefore, even when the authentication is rejected in the case of complete accordance, illegal use of registered biometric authentication information can be prevented without lowering a rate of falsely rejecting a valid person. For example, the similarity upper limit may be set to a degree of similarity not more than 99 or 95 (on the assumption that the degree of similarity of registered biometric authentication information is 100). The similarity upper limit used for obtaining the reference information is determined specifically in accordance with the characteristics of or the accuracy in acquiring biometric authentication information to be employed (such as a fingerprint, a vein, an iris, a facial pattern or a voice print). When the degree of similarity exceeds the similarity upper limit, the information is rejected to be used as the reference information (rejected to be authenticated as the reference information), and when it is below the lower limit of the authentication range, the information is also rejected to be employed as the reference information because of insufficient similarity.

With respect to the second biometric authentication information, the degree of similarity to the reference information is discriminated as shown in FIG. 3B, and when the degree of similarity is within a prescribed authentication range (namely, is beyond a similarity lower limit and below a similarity upper limit), it is determined, as a result of a series of authentication processes performed on the biometric authentication information acquired plural times, that the authentication is permitted.

In this exemplary embodiment, the similarity upper limit of the authentication range of the degree of similarity between the second biometric authentication information and the reference information is set to a degree of similarity less than 100 as shown in FIG. 3B. Although the similarity upper limit is a degree of similarity of 99 in the case exemplified in FIG. 3B, the similarity upper limit is not limited to 99 but may be set to a smaller value (of, for example, 95), and the similarity upper limit is set in accordance with the type of and the accuracy in acquiring biometric authentication information. In this exemplary embodiment, when the degree of similarity of the second biometric authentication information to the reference information exceeds the similarity upper limit, the authentication is always rejected. Thus, even when the first biometric authentication information is successfully authenticated, an impostor illegally using the first biometric authentication information can be prevented.

When the degree of similarity to the reference information is below the similarity lower limit of the authentication range, the similarity of the information is insufficient, and hence, it is determined that the authentication is rejected because there is a danger of illegal use of the second biometric authentication information. The similarity lower limit shown as a reference value 2 in FIG. 3B may be the same as the lower limit value (shown as a reference value 1) used in setting the reference information or may be different from the reference value 1 in accordance with a difference in time and accuracy in acquiring the registered biometric authentication information.

For example, the authentication range for the first biometric authentication information is set so that the rate of falsely rejecting valid biometric authentication information (False Rejection Rate: FRR) can be approximately 0.1% and that the rate of falsely accepting invalid biometric authentication information (False Acceptance Rate: FAR) can be approximately 0.001%. Furthermore, the authentication range for the second biometric authentication information against the reference information set under the aforementioned conditions can be determined so that, for example, the FAR can be lower than in the discrimination of the first authentication information even when the FRR is higher than in the discrimination of the first authentication information.

The first biometric authentication information and the second biometric authentication information may be acquired by the same or different methods. For example, the same type of biometric authentication information may be acquired by using different reader sections, with the accuracy of the reader section set differently or by employing different reading methods. In this case, the similarity upper limit and the similarity lower limit of each of the similarity range used for setting the reference information (namely, for the first discrimination) and the similarity range used for authentication against the reference information (namely, for the second discrimination) may be set to values in accordance with the methods and conditions for the respective discriminations.

When a degree of similarity of a feature extracted from biometric authentication information is discriminated as described above, the authentication ranges to be set for the extracted feature may be those shown in FIGS. 3A and 3B described above. Alternatively, when a plurality of features are extracted, the authentication range is set with respect to each feature in accordance with the accordance characteristic of the feature, so that the authentication can be performed on the basis of the number of features falling within the authentication ranges. Alternatively, a plurality of features may be discriminated by using a common authentication range and the discrimination results of the features may be respectively weighted in consideration of the accordance characteristics of the features, so as to determine whether or not the biometric authentication information is within the authentication range as a whole. In either case, as conceptually illustrated in FIGS. 3A and 3B, it is discriminated whether or not acquired biometric authentication information is within a prescribed authentication range against registered biometric authentication information or reference information, and the authentication is executed on the basis of the result of the discrimination.

Biometric authentication information having been successfully authenticated may be stored as history in the storage section 50 or the like, and in the authentication of new biometric authentication information, not only a degree of similarity to registered biometric authentication information in the first discrimination and a degree of similarity to reference information in the second discrimination but also history information may be discriminated in both the discriminations.

Specifically, even if the authentication is permitted as a discrimination result of a degree of similarity to registered biometric authentication information or a degree of similarity to reference information, when a degree of similarity to history information exceeds a prescribed similarity upper limit, the authentication is ultimately rejected. The discrimination of the similarity to the history information may be executed on either of the first and second biometric authentication information in each authentication. Alternatively, for example, reference information set in past authentication may not be deleted but stored in the storage section 50 as history information, so that not only a degree of similarity to latest reference information but also a degree of similarity to past reference information stored as the history information (i.e., reference information based on biometric authentication information acquired previously) may be discriminated in authentication performed subsequently.

When one or both of first biometric authentication information and second biometric authentication information used when authentication was permitted (for example, first biometric authentication information of past authentication: past reference information) is stored as history information, the history information may be stored, for example, in a prescribed number or during a prescribed period of time, so that a degree of similarity between latest acquired biometric authentication information and each of a plurality of history information can be discriminated.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication apparatus comprising:
a memory, the memory having authenticated biometric information of a user to be authenticated stored therein;
an acquiring section that acquires first biometric authentication information of the user and second biometric authentication information of the user by different methods and different reader sections;
a processor that controls the acquiring section to acquire the first biometric authentication information and the second biometric authentication information, and the processor executing instructions that cause the authentication apparatus to function as:
an authenticating section that compares the first biometric authentication information to the authenticated biometric information, authenticates the first biometric authentication information based on a result of the comparing, and sets the authenticated first biometric authentication information as reference biometric authentication information; and
a discriminating section that determines a degree of similarity between the reference biometric authentication information and the second biometric authentication information, and rejects authentication of the user in response to determining that the degree of similarity exceeds a prescribed degree of similarity, wherein a false rejection rate (FRR) of a first authentication range between the first biometric authentication information and the authenticated biometric authentication information is lower than an FRR of a second authentication range between the second biometric authentication information and the reference biometric authentication information, and a false acceptance rate (FAR) of the first authentication range between the first biometric authentication information and the authenticated biometric authentication information is higher than an FAR of the second authentication range between the second biometric authentication information and the reference biometric authentication information, the FRR showing a rejection rate falsely rejecting the user and the FAR showing an acceptance rate falsely accepting another user different from the user.

2. An authentication apparatus comprising:

a memory, the memory having authenticated biometric information of a user stored therein;

an acquiring section that acquires first biometric authentication information of the user and second biometric authentication information of the user by different methods and different reader sections;

a processor that controls the acquiring section to acquire the first biometric authentication information and the second biometric authentication information, and the processor executing instructions that cause the authentication apparatus to function as: an authenticating section that compares the first biometric authentication information to the authenticated biometric information, authenticates the first biometric authentication information based on a result of the comparing, and sets the authenticated first biometric authentication information as reference biometric authentication information; and a discriminating section that determines a degree of similarity between the reference biometric authentication information and the second biometric authentication information, and permits authentication of the user in response to determining that the degree of similarity is equal to or less than a first degree of similarity and the degree of similarity is greater than or equal to a second degree of similarity, the second degree of similarity less than the first degree of similarity, wherein a false rejection rate (FRR) of a first authentication range between the first biometric authentication information and the authenticated biometric authentication information is lower than an FRR of a second authentication range between the second biometric authentication information and the reference biometric authentication information, and a false acceptance rate (FAR) of the first authentication range between the first biometric authentication information and the authenticated biometric authentication information is higher than an FAR of the second authentication range between the second biometric authentication information and the reference biometric authentication information, the FRR showing a rejection rate falsely rejecting the user and the FAR showing an acceptance rate falsely accepting another user different from the user.

3. The authentication apparatus according to claim 1, wherein the discriminating section permits authentication of the user in response to determining that the degree of similarity does not exceed the prescribed degree of similarity, and the processor stores the authenticated second biometric authentication information in the memory as a history of biometric authentication, and wherein the processor controls the acquiring section to acquire third biometric authentication information of the user and fourth biometric authentication information of the user, and executes instructions that cause the authentication apparatus to function as the authentication section and the discriminating section, the authenticating section further comparing the third biometric authentication information to the authenticated biometric information, authenticating the third biometric authentication information based on a result of the comparing, and setting the authenticated third biometric authentication information as second reference biometric authentication information, and the discriminating section further determining a second degree of similarity between the second reference biometric authentication information and the fourth biometric authentication information and a third degree of similarity between the history of biometric authentication and the fourth biometric authentication information, and rejecting the authentication of the user in response to determining that the second degree of similarity or the third degree of similarity exceeds the prescribed degree of similarity.

4. A non-transitory computer-readable recording medium having embodied thereon a program, which when executed by a processor of an authentication apparatus causes the authentication apparatus to execute a method of authenticating a user, the method comprising:

acquiring first biometric authentication information of the user and second biometric authentication information of the user by different methods and different reader sections;

comparing the first biometric authentication information to authenticated biometric information of the user;

authenticating the first biometric authentication information based on a result of the comparing;

setting the authenticated first biometric authentication information as reference biometric authentication information;

determining a degree of similarity between the reference biometric authentication information and the second biometric authentication information;

determining that the degree of similarity exceeds a prescribed degree of similarity; and rejecting authentication of the user in response to determining the degree of similarity exceeds the prescribed degree of similarity, wherein a false rejection rate (FRR) of a first authentication range between the first biometric authentication information and the authenticated biometric authentication information is lower than an FRR of a second authentication range between the second biometric authentication information and the reference biometric authentication information, and a false acceptance rate (FAR) of the first authentication range between the first biometric authentication information and the authenticated biometric authentication information is higher than an FAR of the second authentication range between the second biometric authentication information and the reference biometric authentication information, the FRR showing a rejection rate falsely rejecting the user and the FAR showing an acceptance rate falsely accepting another user different from the user.

5. A non-transitory computer-readable recording medium having embodied thereon a program, which when executed by a processor of an authentication apparatus causes the authentication apparatus to execute a method of authenticating a user, the method comprising:

acquiring first biometric authentication information of the user and second biometric authentication information of the user by different methods and different reader sections;

comparing the first biometric authentication information to authenticated biometric information of the user;

authenticating the first biometric authentication information based on a result of the comparing;

setting the authenticated first biometric authentication information as reference biometric authentication information;

determining a degree of similarity between the reference biometric authentication information and the second biometric authentication information;

determining that the degree of similarity is equal to or less than a first degree of similarity and the degree of similarity is greater than or equal to a second degree of similarity, the second degree of similarity less than the first degree of similarity; and permitting authentication of the user in response to determining the degree of similarity is equal to or less than the first degree of similarity and the degree of similarity is greater than or equal to the second degree of similarity, wherein a false rejection rate (FRR) of a first authentication range between the first biometric authentication information and the authenticated biometric authentication information is lower than an FRR of a second authentication range between the second biometric authentication information and the reference biometric authentication information, and a false acceptance rate (FAR) of the first authentication range between the first biometric authentication information and the authenticated biometric authentication information is higher than an FAR of the second authentication range between the second biometric authentication information and the reference biometric authentication information, the FRR showing a rejection rate falsely rejecting the user and the FAR showing an acceptance rate falsely accepting another user different from the user.

6. The non-transitory computer-readable medium according to claim 4, wherein the method of authenticating the user further comprises:

permitting authentication of the user in response to determining that the degree of similarity does not exceed the prescribed degree of similarity;

storing the authenticated second biometric authentication information as a history of biometric authentication;

acquiring third biometric authentication information of the user and fourth biometric authentication information of the user;

comparing the third biometric authentication information to the authenticated biometric information;

authenticating the third biometric authentication information based on a result of the comparing;

setting the authenticated third biometric authentication information as second reference biometric authentication information;

determining a second degree of similarity between the second reference biometric authentication information and the fourth biometric authentication information and a third degree of similarity between the history of biometric authentication and the fourth biometric authentication information; and rejecting the authentication of the user in response to determining that the second degree of similarity or the third degree of similarity exceeds the prescribed degree of similarity.

* * * * *